(12) United States Patent
Hindawi et al.

(10) Patent No.: US 7,607,572 B2
(45) Date of Patent: *Oct. 27, 2009

(54) FORMALIZING, DIFFUSING, AND ENFORCING POLICY ADVISORIES AND MONITORING POLICY COMPLIANCE IN THE MANAGEMENT OF NETWORKS

(75) Inventors: David Salim Hindawi, Berkeley, CA (US); David Leigh Donoho, Stanford, CA (US); Lisa Ellen Lippincott, Berkeley, CA (US); Dennis S. Goodrow, Santa Rosa, CA (US); James Milton Brown, Novato, CA (US); Peter Lincroft, Berkeley, CA (US); Peter Benjamin Loer, Oakland, CA (US); Orion Yosef Hindawi, Berkeley, CA (US)

(73) Assignee: Bigfix, Inc., Emeryville, CA (US)

( * ) Notice: Subject to any disclaimer, the term of this patent is extended or adjusted under 35 U.S.C. 154(b) by 203 days.

This patent is subject to a terminal disclaimer.

(21) Appl. No.: 10/495,109

(22) PCT Filed: Nov. 12, 2002

(86) PCT No.: PCT/US02/36644

§ 371 (c)(1),
(2), (4) Date: May 6, 2004

(87) PCT Pub. No.: WO03/040944

PCT Pub. Date: May 15, 2003

(65) Prior Publication Data

US 2004/0243696 A1     Dec. 2, 2004

Related U.S. Application Data

(63) Continuation-in-part of application No. 09/521,805, filed on Mar. 9, 2000, now Pat. No. 7,277,919.

(51) Int. Cl.
    *G06F 7/00*     (2006.01)
    *G06F 15/16*     (2006.01)

(52) U.S. Cl. .................. 235/376; 709/208; 709/209; 709/211; 709/230; 709/203

(58) Field of Classification Search .............. 235/375, 235/376, 385; 709/206, 207, 223, 203, 204, 709/205; 715/853, 234; 707/3, 10, 200
See application file for complete search history.

(56) References Cited

U.S. PATENT DOCUMENTS 5,586,304 A     12/1996     Stupek, Jr. et al.

(Continued)

FOREIGN PATENT DOCUMENTS

JP     2000-259477     9/2000
JP     2000-357064     12/2000

OTHER PUBLICATIONS www.amazon.com, Microsoft Windows 2000 Server, Apr. 3, 2007.*

(Continued)

*Primary Examiner*—Thien M. Le
*Assistant Examiner*—Thien T Mai
(74) *Attorney, Agent, or Firm*—Michael A. Glenn; Glenn Patent Group (57) ABSTRACT

An apparatus and method for centralized policy management of large-scale networks (221) of computational devices is disclosed. The apparatus includes a number of distributed clients (400) run on registered computers (201-203), gathering policy advisories (401) and reporting (405) relevance (403) to a system administrator (224). The system administrator may view the relevant messages (505) through a management interface (500) and deploy suggested actions to distributed clients (503), where the actions are executed to apply the solutions of the advisories (408).

26 Claims, 7 Drawing Sheets

U.S. PATENT DOCUMENTS

| | | | |
|---|---|---|---|
| 5,815,652 A | 9/1998 | Ote et al. | |
| 5,978,845 A | 11/1999 | Reisacher | |
| 6,023,507 A * | 2/2000 | Wookey | 709/224 |
| 6,023,698 A * | 2/2000 | Lavey et al. | 707/10 |
| 6,101,537 A * | 8/2000 | Edelstein et al. | 709/219 |
| 6,145,001 A | 11/2000 | Scholl et al. | |
| 6,151,708 A * | 11/2000 | Pedrizetti et al. | 717/173 |
| 6,161,218 A | 12/2000 | Taylor | |
| 6,237,144 B1 | 5/2001 | Delo | |
| 6,240,451 B1 | 5/2001 | Campbell et al. | |
| 6,243,737 B1 * | 6/2001 | Flanagan et al. | 709/202 |
| 6,253,211 B1 * | 6/2001 | Gillies et al. | 707/201 |
| 6,256,664 B1 * | 7/2001 | Donoho et al. | 709/204 |
| 6,256,668 B1 | 7/2001 | Slivka et al. | |
| 6,263,362 B1 * | 7/2001 | Donoho et al. | 709/207 |
| 6,289,510 B1 | 9/2001 | Nakajima | |
| 6,321,258 B1 | 11/2001 | Stolfus et al. | |
| 6,324,691 B1 | 11/2001 | Gazdik | |
| 6,324,693 B1 | 11/2001 | Broderson et al. | |
| 6,327,617 B1 | 12/2001 | Fawcett | |
| 6,330,715 B1 | 12/2001 | Razzaghe-Ashrafi | |
| 6,345,386 B1 | 2/2002 | Dolo et al. | |
| 6,347,396 B1 | 2/2002 | Gard | |
| 6,347,398 B1 | 2/2002 | Parthasarathy et al. | |
| 6,353,928 B1 | 3/2002 | Altberg et al. | |
| 6,356,936 B1 * | 3/2002 | Donoho et al. | 709/206 |
| 6,360,366 B1 | 3/2002 | Heath et al. | |
| 6,378,128 B1 | 4/2002 | Edelstein et al. | |
| 6,381,742 B2 | 4/2002 | Forbes et al. | |
| 6,389,589 B1 | 5/2002 | Mishra et al. | |
| 6,418,554 B1 | 7/2002 | Delo et al. | |
| 6,449,642 B2 | 9/2002 | Bourke-Dunphy et al. | |
| 6,460,175 B1 | 10/2002 | Ferr et al. | |
| 6,493,594 B1 | 12/2002 | Kraml | |
| 6,496,977 B1 | 12/2002 | Hamilton, II et al. | |
| 6,523,166 B1 | 2/2003 | Mishra et al. | |
| 6,532,491 B1 | 3/2003 | Lakis et al. | |
| 6,557,054 B2 | 4/2003 | Reisman | |
| 6,594,369 B1 | 7/2003 | Une | |
| 6,594,692 B1 | 7/2003 | Reisman | |
| 6,594,759 B1 | 7/2003 | Wang | |
| 6,604,130 B2 * | 8/2003 | Donoho et al. | 709/204 |
| 6,611,862 B2 | 8/2003 | Reisman | |
| 6,654,714 B1 | 11/2003 | Gentile et al. | |
| 6,658,464 B2 | 12/2003 | Reisman | |
| 6,658,489 B1 | 12/2003 | Asselin | |
| 6,725,242 B2 | 4/2004 | Gardner | |
| 6,725,452 B1 | 4/2004 | Te'eni et al. | |
| 6,735,766 B1 | 5/2004 | Chamberlain et al. | |
| 6,745,224 B1 | 6/2004 | D'Souza et al. | |
| 6,769,009 B1 | 7/2004 | Reisman | |
| 6,789,255 B1 | 9/2004 | Pedrizetti et al. | |
| 6,802,061 B1 | 10/2004 | Parthasarathy et al. | |
| 6,804,663 B1 | 10/2004 | Delo | |
| 6,836,794 B1 | 12/2004 | Lucovsky et al. | |
| 6,904,457 B2 | 6/2005 | Goodman | |
| 6,920,631 B2 | 7/2005 | Delo | |
| 6,922,831 B1 | 7/2005 | Kroening et al. | |
| 6,941,453 B2 | 9/2005 | Rao | |
| 6,971,094 B1 | 11/2005 | Ly | |
| 6,996,815 B2 | 2/2006 | Bourke-Dunphy et al. | |
| 6,996,819 B1 | 2/2006 | Alanis | |
| 2002/0116509 A1 * | 8/2002 | DeLaHuerga | 709/229 |
| 2002/0124213 A1 * | 9/2002 | Ahrens et al. | 714/57 |
| 2003/0066886 A1 * | 4/2003 | Hoffman et al. | 235/385 |
| 2003/0150908 A1 * | 8/2003 | Pokorny et al. | 235/375 |
| 2003/0155415 A1 * | 8/2003 | Markham et al. | 235/376 |

OTHER PUBLICATIONS amazon.com, Microsoft Windows NT Server 4.0 with NT Option Pack Server Pack, Apr. 3, 2007.* amazon.com, Microsoft Windows NT Server 4.0 Terminal Edition, Apr. 3, 2007.*

Alceu, Jr. et al.; "Intelligent Management of Computer Networks: The GIR Proposal"; Nov. 9-14, 1998; SCCC '98, XVIII Int'l Conf. of the Chilean Society of Computer Science, pp. 40-47.

* cited by examiner

FIG. 1

Prior Art

FORMALIZING, DIFFUSING, AND ENFORCING POLICY ADVISORIES AND MONITORING POLICY COMPLIANCE IN THE MANAGEMENT OF NETWORKS

CROSS REFERENCE TO RELATED APPLICATION

This application is a continuation-in-part of U.S. patent application Ser. No. 09/521,805, filed Mar. 9, 2000 now U.S. Pat. No. 7,277,919.

TECHNICAL FIELD

The invention relates to network management technology. More particularly, the invention relates to an apparatus and method of policy publication, diffusion and enforcement for management of large-scale networks of computational devices.

BACKGROUND OF THE INVENTION

Information technology (IT) administrators in enterprises everywhere face a daunting task of managing the software and hardware on tens, hundreds, or thousands of machines in their domains. With so many incompatibilities, patches, and policy advisories announced daily, the task is much more than just acquisition and installation. Even simply keeping aware of all potentially problematic situations on hardware and software products used in an enterprise requires more than a full-time job. Dealing with those situations in response to user complaints adds still further taxing demands. Thus it is required that IT managers must anticipate the situations which may soon arise in a specific enterprise and make plans to deal with those before they cause major problems. This creates an urgent need of a technique which enables the IT managers to understand the configuration of the hardware and software in a given intranet, to keep track of the policy advisories, updates, incompatibilities and patches relevant to the specific enterprise, and to match those policy advisories, updates, and patches with the specific equipment in the enterprise.

Donoho et al disclose in U.S. Pat. No. 6,256,664 a technique which enables a collection of computers and associated communications infrastructure to offer a new communications process. This process allows information providers to broadcast information to a population of information consumers. The information may be targeted to those consumers who have a precisely formulated need for the information. This targeting may be based on information which is inaccessible to other communications protocols because, for example, under other protocols the targeting requires each potential recipient to reveal sensitive information, or under other protocols the targeting requires each potential recipient to reveal information obtainable after extensive calculations using data available only upon intimate knowledge of the consumer computer, its contents, and local environment.

This process enables efficient solutions to a variety of problems in modern life, including the automated technical support of modern computers. In the technical support application, the disclosed invention allows a provider to reach precisely those specific computers in a large consumer population which exhibit a specific combination of hardware, software, system settings, data, and local environment, and to offer the users of those computers appropriate remedies to correct problems known to affect computers in such situations.

Figure 1:
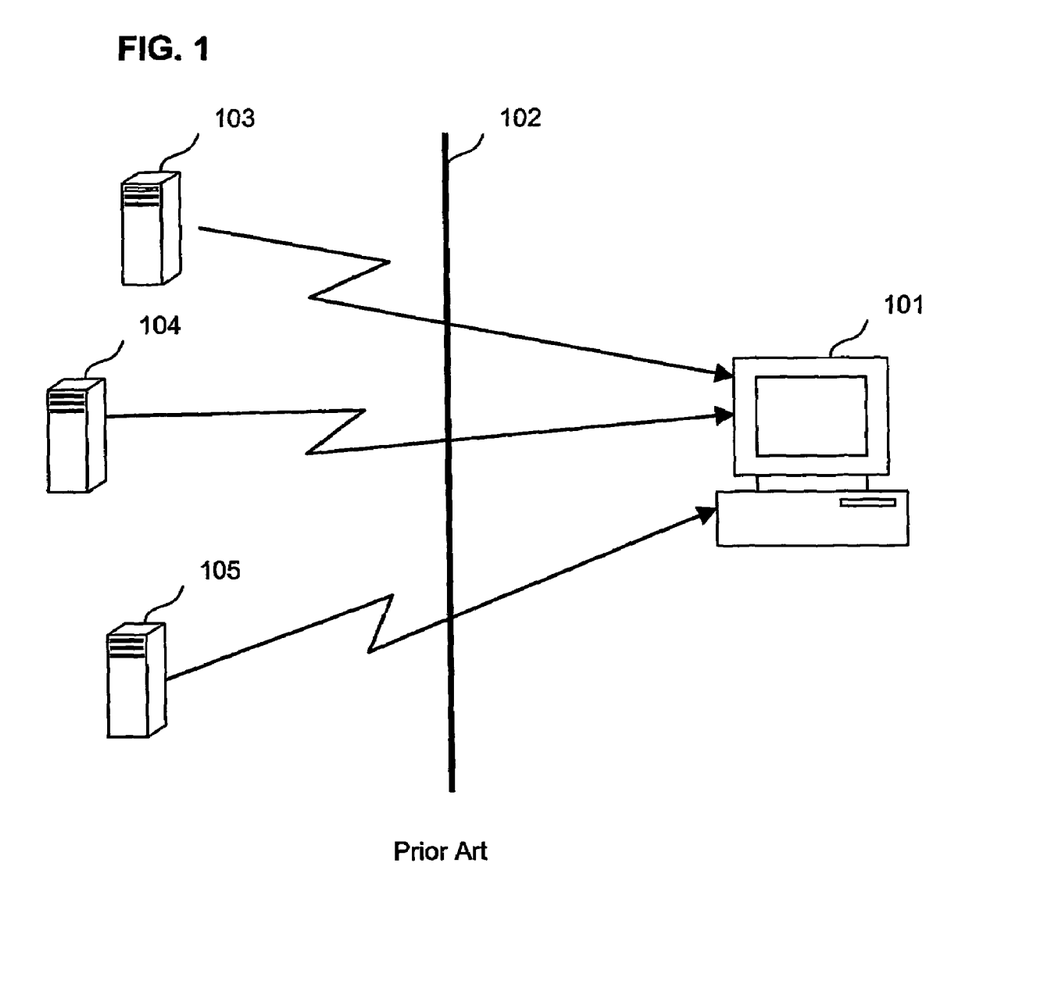
FIG. 1 is a schematic block diagram illustrating a communications system for computed relevant messaging.

FIG. 1 is a schematic block diagram illustrating a communications system for computed relevant messaging according to the prior art. A user directs an advice reader running on his computer 101 to subscribe to three advice provider sites 103-105. The corresponding advice is brought into his computer in the form of digital documents, where the advice reader inspects the advisories for relevance. These digital documents are called advisories. The transfer from Internet 102 to computer is entirely one-way. No information about the user's machine goes back to the advice provider. An advice typically comprises three parts: (1) a relevance clause written in relevance language which is evaluated by the advice reader to determine the relevance of the advice; (2) a message body for providing explanatory material explaining to an advice consumer as to what condition is relevant, why the advice consumer is concerned, and what action is recommended; and (3) an action button for providing the advice consumer with the ability to invoke an automatic execution of a recommended action.

Whereas in the consumer setting it is acceptable for the computer user to be in control of the process, learning which problems exist and applying the fixes, in the enterprise setting it is often the case that end user administration of computers is frowned upon. Instead, computers are often managed centrally, and a system administrator is in charge of keeping configurations workable and avoiding enterprise-wide problems.

What is desired is a technique that provides centralized advice management in a large-scale network of computers.

What is further desired is that such technique provides a management interface that can display relevant advisories of all computers in the network and deploy suggested actions to all relevant computers.

What is still further desired is that such management interface allows a system administrator to manage subscription of advice provider sites, monitor status of deployed actions and monitor status of computers in the network.

What is still further desired is that such technique can automatically apply the required management tasks to fix problems on susceptible machines before they occur.

SUMMARY OF THE INVENTION

A system and method for centralized advice management of large-scale networks is provided, wherein a number of distributed clients run on registered computers, gathering advisories and report relevance to a central server. A system administrator may view the relevant messages through a management interface and deploy suggested actions to distributed clients where the actions are executed to apply the solutions of the advisories.

In the preferred embodiment of the invention, a centralized advice management system is disclosed, which includes a plurality of distributed clients, a central server, a central database, and a management interface. The distributed clients gather advisories from a plurality of advice provider sites and report relevance of advisories to the central server. A system administrator may view the details of relevant advisories and deploy the suggested actions to distributed clients of relevant computers, where the actions are executed to apply solutions provided by the advisories.

In another equally preferred embodiment, a centralized advice management system is disclosed, which includes a plurality of distributed clients, a mirror server, a central server, a central database, and a management interface.

In another equally preferred embodiment, a centralized advice management system having a distributed client is disclosed, in which the distributed client comprises various components performing functions such as gathering advisories, authenticating advisories, evaluating relevance of advisories, registering a computer to a central server, reporting relevance to the central server, listening messages from the central server, gathering deployed actions from the central server, and executing deployed actions.

In another equally preferred embodiment, a method for providing centralized advice management for large-scale computer networks is disclosed. The method comprises the steps of:

The distributed clients on the computers register to a central server;

A system administrator subscribes registered computers to advice provider sites;

The distributed clients gather advisories from subscribed advice provider sites;

The distributed clients report relevance to the central server;

The system administrator views relevant advisories using a management interface;

The system administrator deploys actions suggested by the advisories to the distributed clients; and The distributed clients execute the deployed actions to apply the solutions of the advisories.

The method may further comprise a step to manage subscription of advice provider sites to the distributed clients. It may further comprise a step to monitor the status of deployed actions. Alternatively, it may further comprise a step to monitor the status of registered computers.

DETAILED DESCRIPTION OF THE INVENTION

Centralized Advice Management System

Figure 2:
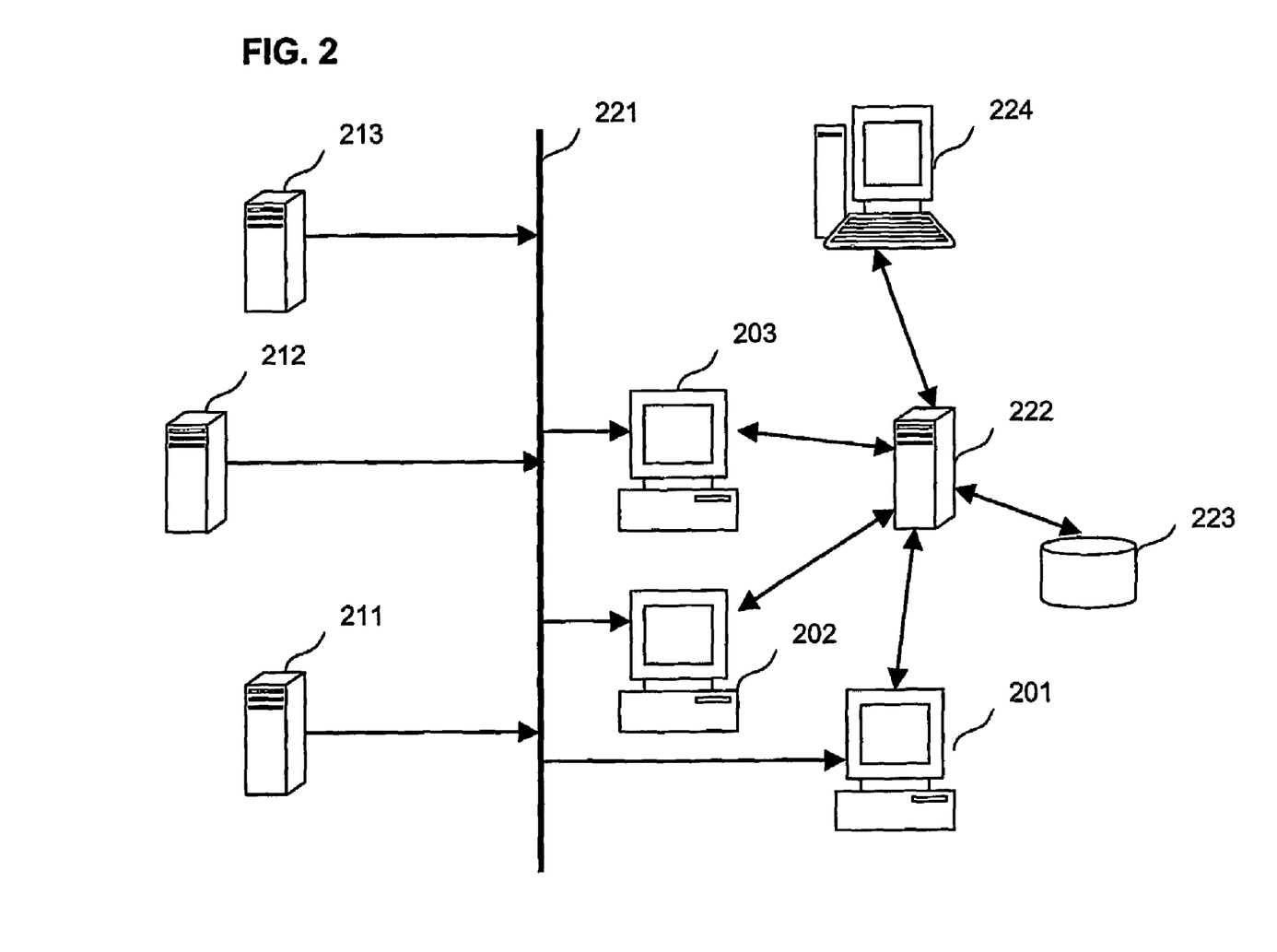
FIG. 2 is a block diagram illustrating a typical advice management system in large-scale computer networks according to the invention.

FIG. 2 is a block diagram illustrating an advice management system in large-scale computer networks according to one preferred embodiment of the invention. The centralized advice management system comprises a plurality of distributed clients 201-203; a central server 222, a central database 223, and a management interface 224.

A distributed client is installed on every machine to manage under the system.

Each of the distributed clients accesses a plurality of advice provider sites 211-213 through the Internet 221 and receives a pool of advisories that specify known problematic conditions. The client also monitors the configuration and status of the computer on which it is installed to see if any of predefined conditions arises, and sends to the central server 222 a message when such a condition arises. The distributed client communicates with the central server 222 on a regular basis, according to several defined interactions, and may obtain messages from the central server 222 specifying actions that the distributed client needs to perform, modifying the computer. Ordinarily, the distributed client operates silently, without any direct intervention from the end user of the computer.

The central server 222 comprises a collection of interacting applications including a Web server, CGI-BIN applications, and a database server. The central server coordinates the relay of information to and from individual computers, the storage and retrieval of information about individual computers, and the presentation of information for the system administrator. Ordinarily, the central server components operate silently, without any direct intervention from the administrator. In the moderate-sized deployments, the server processes are hosted by a single server. In the large-scale deployments, it may be useful to segment the server into processes running on separate servers, or to separate the network into several administrative sub-domains.

The central database 223 stores data about individual computers, about advisories that are actively being monitored, and about the history and action status. The central servers interactions primarily affect this database, which typically is a standard Microsoft product (based on the MSDE or SQL Server database engine).

The management interface 224 is an application that constitutes the only visible part of the management system in ordinary operation. It gives the system administrator an overview of the status of the computers in the network, identifying which, if any, of them might exhibit a certain problem or condition, and mandating that those computers, or a subset or them, take actions to correct the situation. The management interface 224 can run on any machine with network access to the central server 222.

Figure 3:
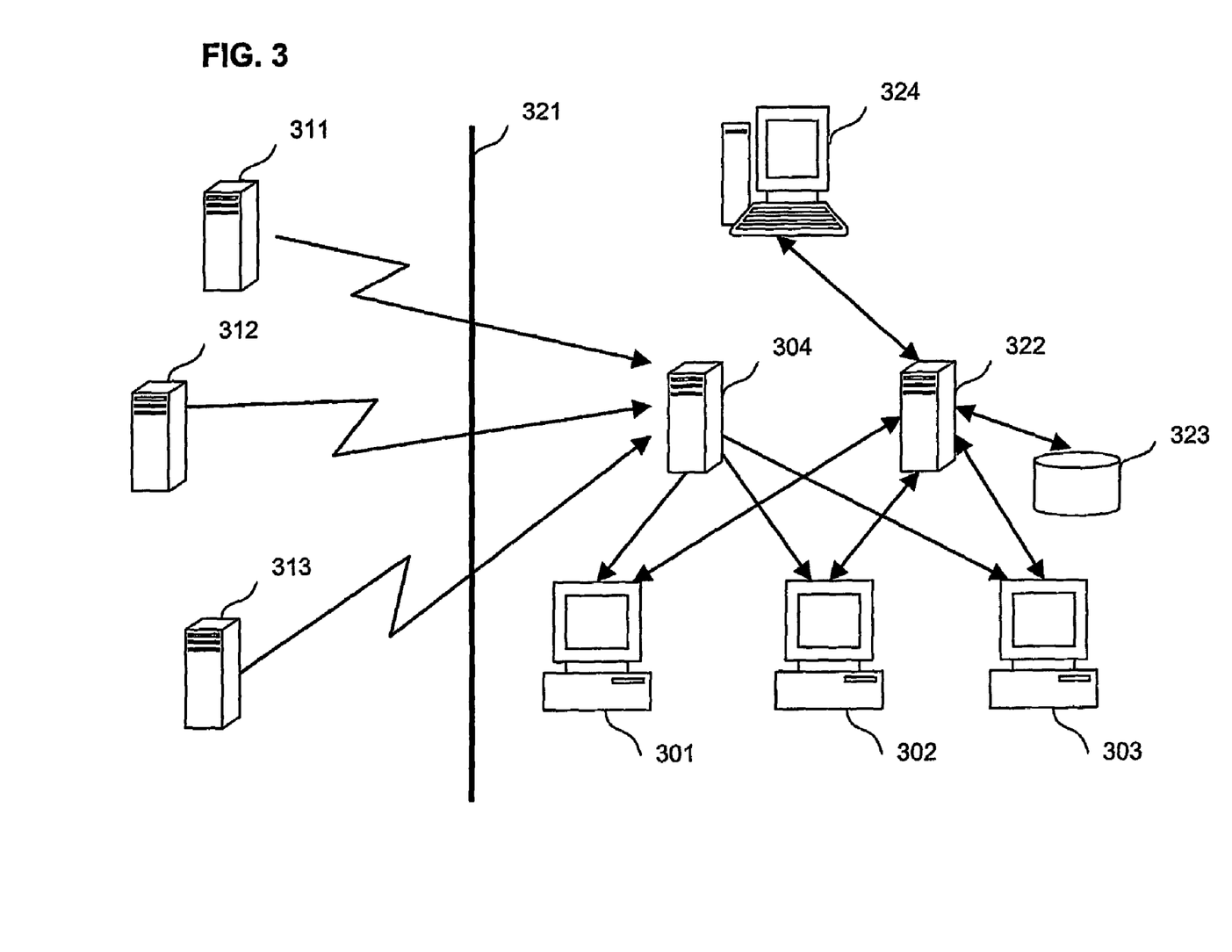
FIG. 3 is a block diagram illustrating another advice management system in large-scale networks according to the invention.

FIG. 3 is a block diagram illustrating an advice management system in large-scale networks of computers according to another preferred embodiment of the invention. The system includes a plurality of distributed clients 301-303, a mirror server 304, a central server 322, a central database 323, and a management interface 324.

A distributed client is installed on every machine to manage under the system of the invention. Each of the distributed clients 301-303 accesses the mirror server 304 to gathering advice messages. The distributed client also monitors the configuration and status of the computer on which it is installed to see if any of the predefined conditions arises, and sends the central server 322 a message when such a condition arises. The distributed client communicates with the central server 322 on a regular basis, according to several defined interactions, and may obtain messages from the central server 322 specifying actions that the distributed client needs to perform to modify the computer. Ordinarily, the distributed client operates silently, without any direct intervention from the computer end user.

The mirror server 304 gathers advice messages from a plurality of advice provider sites 311-313 through the Internet 321 and receives a pool of advisories that specify known problematic conditions.

The central server 322 is a collection of interacting applications including a Web server, CGI-BIN applications, and database server. The central server coordinates the relay of information to and from individual computers, the storage and retrieval of information about individual computers, and the presentation of information for the system administrator.

The central database 323 stores data about individual computers, about advisories that are actively being monitored, and about the history and action status. The central server's interactions primarily affect this database, which typically is a standard Microsoft product (based on the MSDE or SQL Server database engine).

The management interface 324 is an application that constitutes the only visible part of the management system in ordinary operation. It is basically a management interface that gives the system administrator an overview of the status of the computers in the network, identifying which, if any, of them might exhibit a certain problem or condition, and mandating that those computers, or a subset or them, take actions to correct the situation.

The Distributed Client

The distributed client is installed on every machine managed under the advice management system. It is responsible for gathering advisories, studying the configuration of the machine on which it is running, and determining whether any of the advisories is relevant to that computer's configuration. The distributed client communicates relevance status to the central server and executes actions mandated from the management interface. Yet in spite of its power and sophistication, the distributed client is typically a small application, for example, approximately 2 MB, intended to place an imperceptible load on managed computers, to use few network resources, to be secure and reliable, and to require essentially no management, e.g., certainly no end-user or on-site management.

The distributed client has eight distinguishable functions in the advice management system according to the invention. These functions are summarized in Table 1.

TABLE 1

Functions of Distributed Client

| | |
|---|---|
| Gather | Gather advisories from advice provider sites. |
| Authenticate | Verify message authenticity. |
| Evaluate | Check advisories against computer configuration for relevance. |
| Register | Identify computer to central server. |
| Report | Report computer relevance event to central server. |
| Listen | Listen for messages from central server. |
| Gather actions | Gather action requests from central server. |
| Act | Execute action to change computer configuration. |

Figure 4:
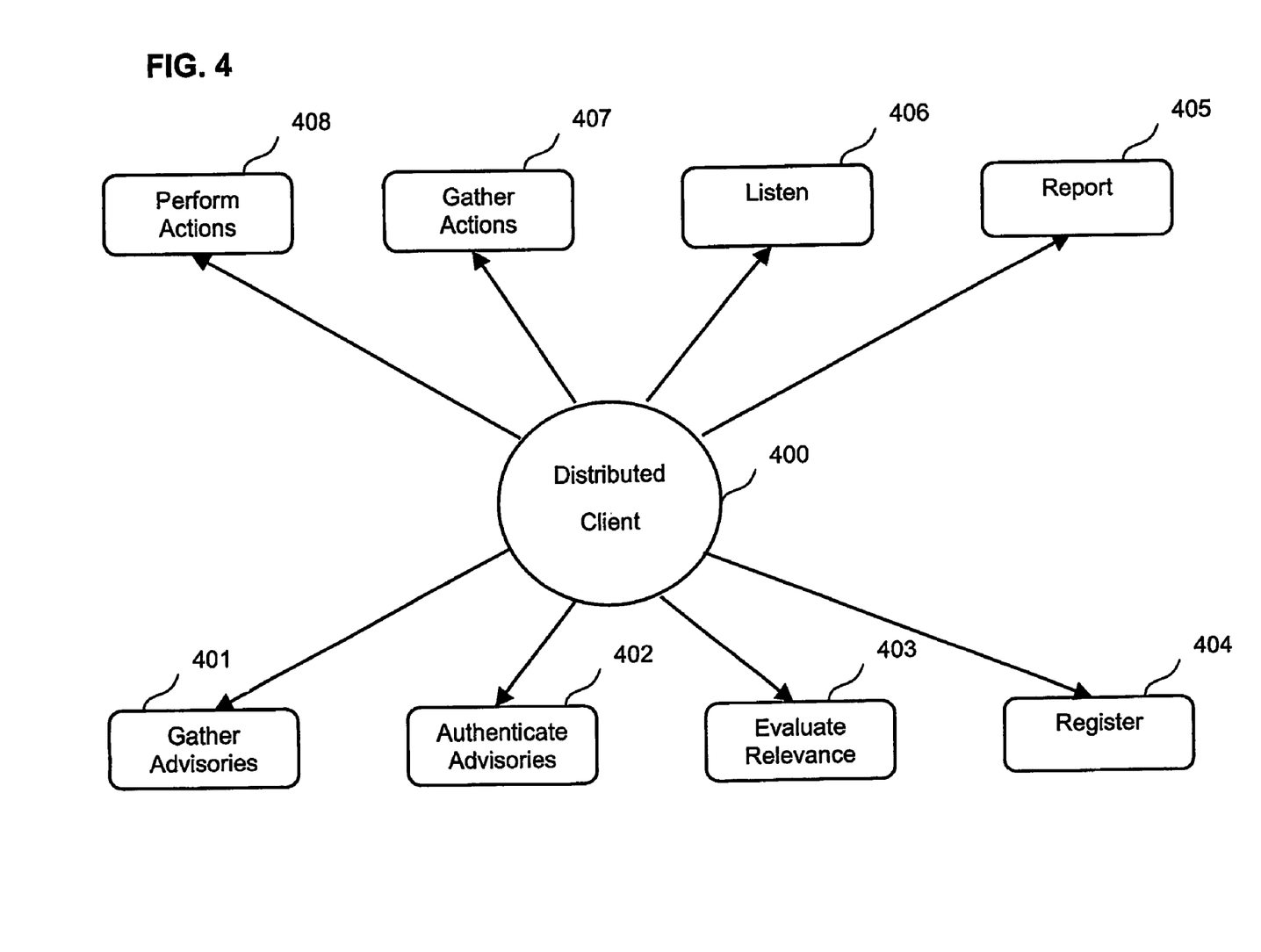
FIG. 4 is a block diagram illustrating the main functions of a distributed client according to the invention.

FIG. 4 is a block diagram illustrating the main functions of a distributed client 400 according to another preferred embodiment of the invention. The functions include: gather advisories 401, authenticate advisories 402, evaluate relevance 403, register 404, report 405, listen 406, gather actions 407, and perform actions 408.

Gather advisories 401

The system administrator uses the management interface to subscribe computers in the organization to various advice provider sites. It is the job of the distributed client to connect to the sites periodically and synchronize its local advice content with the content at those sites. To do so, the distributed client looks in each site's masthead file. The masthead files are kept on the computer in the folder in which the distributed client is installed. From the masthead file, the distributed client extracts the URL for the location from which content is served. It then uses HTTP commands to obtain any new advice content.

Authenticate Messages 402

The distributed client checks that the advice content is authentic, i.e. digitally signed by the true owner of the advice provider site.

Evaluate Relevance 403

The distributed client parses the advisories and learns what aspects of the computer configuration need to be evaluated to determine the relevance of those advisories. Then the distributed client scans the computer configuration to determine whether the actual configuration matches the relevance clause.

It is important to note that this scanning takes place periodically, so that as the system configuration changes, the result of relevance evaluation can change as well.

Register 404

The computer running the distributed client needs not be restricted to be always on or to be in one place, or even within one virtual LAN. To accommodate such dynamic behavior, the management system needs the distributed client to identify itself to the central server when it is running and ready to communicate. This process is called registration. The management system assigns the distributed client a unique computer ID to identify itself in communications.

Report 405

When the distributed client detects that some advice has become relevant, it reports to the central server that a relevance event has occurred. It identifies the advice that became relevant along with its own computer ID.

Listen 406

The distributed client listens to the messages sent to it from the central server (by default on port 6603). These messages can contain either the computer ID from the registration process or certain process requests, such as a request to "gather actions now," as described below.

Gather Actions 407

In response to receiving information indicating a relevance event from the distributed client, the system administrator sees a recommended action at the management interface. If the administrator decides to propagate the action, action requests are placed at the action site. Distributed clients gather action requests from the action site on a periodic basis, and sometimes, in response to prompts from the central server, can also gather requests outside the usual schedule.

Perform Actions 408

Upon receiving an authenticated action request, the distributed client performs the requested action.

Note that the distributed client goes beyond the consumer procedure to include the steps of registration, reporting, listening, and gathering actions. These reflect the needs and desires of system administrators in the enterprise setting.

The Management Interface

Figure 5:
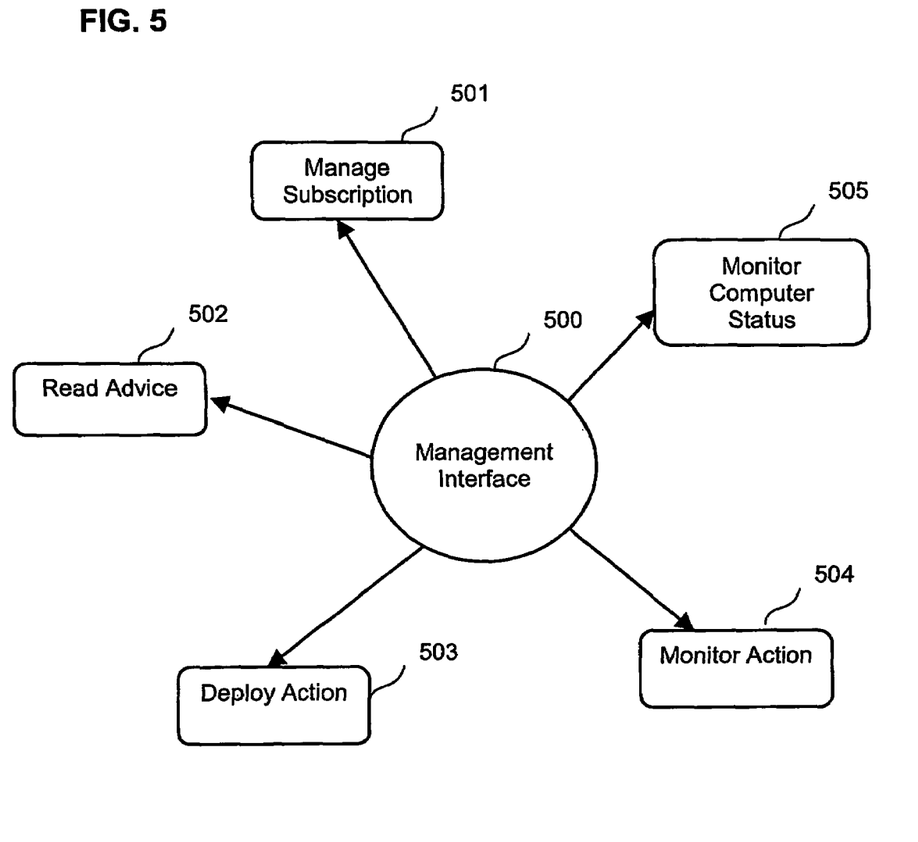
FIG. 5 is a block diagram illustrating the main functions of a management interface according to the invention.

FIG. 5 is a block diagram illustrating the main functions of a management interface 500 according to another preferred embodiment of the invention.

The management interface 500 is the visible component of the management system, used by the system administrator to maintain the computers throughout the enterprise. The main functions include: manage subscriptions 501, display advice messages 502, deploy actions 503, monitor actions 504, and monitor computer status 505.

Manage Subscriptions 501

The advice management system accesses advice content that has been created by a content provider outside the enterprise, for example a hardware or software supplies, and brings it from the advice provider site into the enterprise.

The advice management system may subscribe to some predefined sites during initial setup. For access to any other advice provider sites besides those that are set up automatically, a system administrator has to initiate subscriptions to those sites.

There are presently two ways to initiate a subscription to an advice provider site. The first way is to provide, through advisories delivered from already subscribed sites, recommendations of enterprise advice provider sites appropriate to the computers in the enterprise. The system administrator can then simply double-click the appropriate action link in the advice message body, and the subscription is to be initiated.

The other way to initiate a subscription requires more conceptual understanding. In general, initiating a subscription requires that a masthead file for that advice provider site be obtained from the intended content provider, and that the file be appropriately announced to the management interface. As with the central server masthead file, the masthead file for the advice provider site contains information about the URL of the server and the frequency of the site operations and it is to be digitally signed. However, unlike the central server masthead file, the masthead file is signed not by the enterprise but rather by the content provider organization.

If the system administrator knows of an advice provider site that offers content for the distributed client and wants to subscribe the management system to use that content, he can obtain the masthead file through a Web browser download. There is generally a Web page, at a well-known Web site or at the content provider's Web site, containing a hyperlink to the masthead file. By double-clicking the link, the masthead file is downloaded from the site to the computer running the Web browser.

The administrator is now ready to initiate the subscription using the management interface. The administrator then selects to which computers in the enterprise he wants to subscribe as the advice provider site. He may subscribe all distributed clients to the site, or a subset based on machine characteristics. He may select a frequency for the distributed clients to check in with the advice provider site and gather new advisories, which typically is daily synchronization, but other options are also available.

The subscription of distributed clients to advice provider sites can be modified through the management interface along with the advice gathering frequency. If a subscription is not useful, the system administrator may also cancel it by removing the advice provider site from the list of those subscribed to.

Display Advisories 502

When advisories become relevant somewhere on the network, the management interface can be used to view summary information about these messages. The summary information may include: (1) The advice name and numeric advice ID, both assigned to the advice message by the advice author; (2) The advice provider site from which the advice originated; and (3) The number of computers in the network to which this message is relevant.

The administrator may also look at the detailed information of a message using the management interface, which typically includes the list of relevant computers, an English-language explanation of the problem and an action providing an automatically solution.

Deploy Actions 503

When the administrator chooses to take a proposed action, he is given several options concerning its deployment which includes: target of action, action message, schedule of action, and execution control.

The target of action specifies the computers on which the action is to be deployed. The administrator may choose to deploy to all computers on the enterprise network, or all relevant computers, or manually selected computers.

The action message requires an active user present when the action is run, to alert the user with a specified message, and to offer certain interactive features on the message display. The user may be able to look at the details of the proposed action and may cancel the proposed action.

The schedule of action allows the administrator to control when the deployed action runs on the targeted computers. The administrator may also specify an expiration time to impose a limitation on the lifetime of the action.

The execution control allows the administrator to control status of the action after invocation, retry of actions and certain post-action tasks.

Once the administrator specifies these options, he enters the signing password to deploy the action.

Monitor Actions 504

After actions are scheduled, the central server attempts to signal individual computers that actions are waiting for them. Ideally, the distributed client gathers the action information from the action server and carries it out. In reality, some computers may be powered off and others may be mobile at the time of the signal, so at least some actions may not be executed immediately.

The management interface can be used to observe the status of deployed actions, whether pending, running, completed successfully or failed. The administrator can also view detailed information of the deployed actions such as the various options he specifies when the action is deployed. He can also stop a previously deployed action that has not yet finished running.

Monitor Computer Status 505

Although the advice management system is typically deployed as a mass preventive maintenance tool, it also has several features that allow for analysis and display of computer configuration information. In effect, the management interface can query computers in the enterprise network about a very large range of characteristics as configured by the administrator, and get real-time responses about those selected characteristics across all machines in the domain. The administrator can use relevance language to write expressions that can name a rather rich collection of properties of the software and hardware on the machine, and he can direct computers in the enterprise network to evaluate those expressions and return the resulting value.

The following example demonstrates that an "OS" computer property is actually generated by the relevance clause:

Name of operating system & " " & release of operating system & " " & build number of operating system as string It means that this property is actually a concatenation of three strings of information produced by suitable relevance expressions and separated by spaces.

The administrator can specify that new computer properties be added to the central database by specifying a name for the new property and entering the appropriate relevance clause, yielding an expression that each distributed client is then routinely evaluated. This may be very useful because it can access not only hardware characteristics but also registry entries and even data in specific files on the end-user computer.

After the new property is added, the distributed clients in the domain automatically compute the value of the corresponding relevance expression and return it to the central database.

The management interface can access a list of all the computers on the network. For each specific computer, the administrator may view retrieved properties, as well as information of subscription, relevance, relevant history, or action. The subscription information includes the advice provider sites to which the computer has subscribed. The relevant information includes a listing of advice messages that are currently relevant to the computer. The relevant history information includes a listing of all advice messages that have ever been relevant to the computer. The action information includes a listing of all actions that have ever been deployed to the computer.

Figure 6:
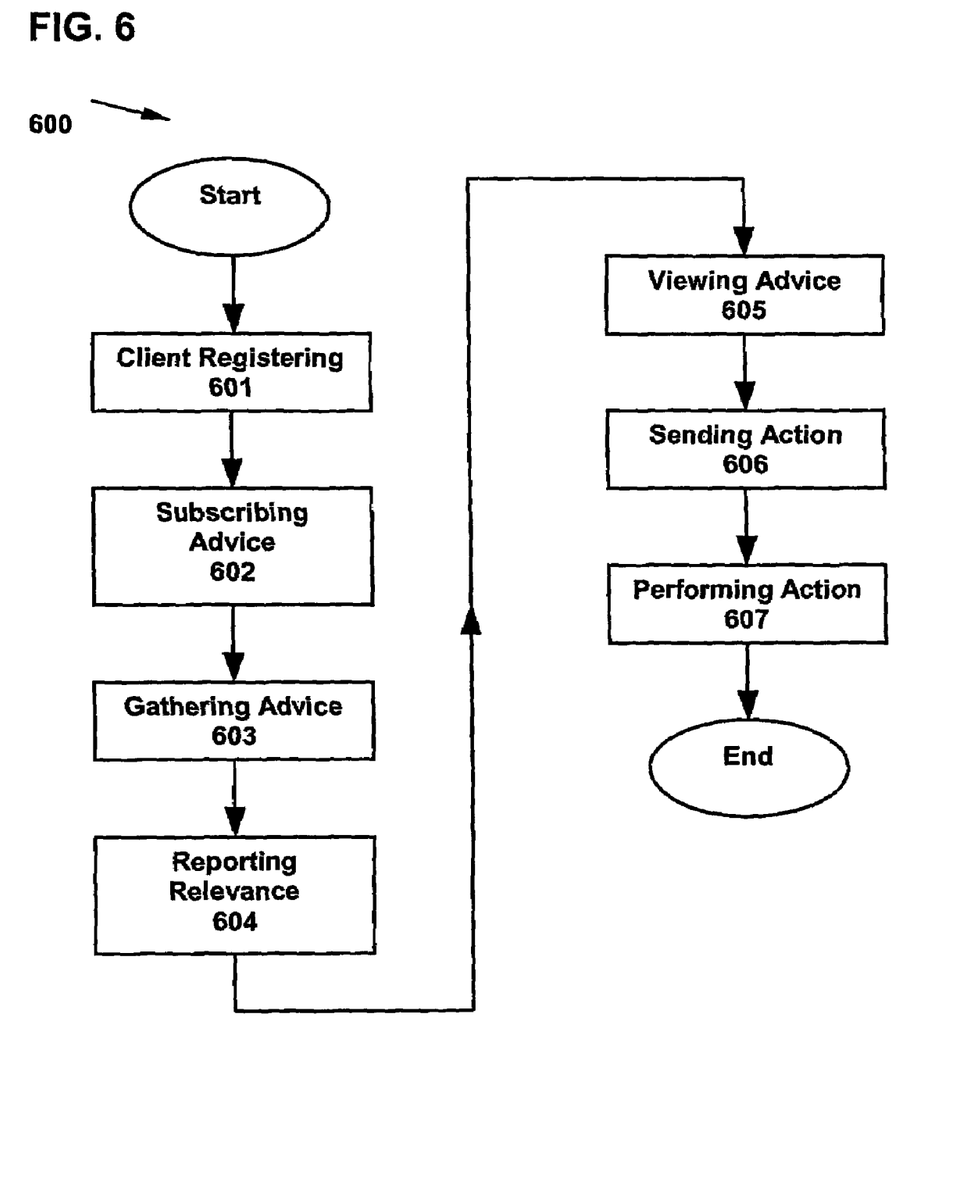
FIG. 6 is a flow diagram illustrating a method 600 for providing centralized advice management according to the invention.

FIG. 6 is a flow diagram illustrating a communication method 600 for providing centralized advice management of large-scale computer networks according to one embodiment of the invention. A typical implementation of the method comprises the steps of:

Step 601: The distributed client running on each computer registers to the central server;

Step 602: The administrator subscribes the computers to a plurality of advice provider sites using the management interface;

Step 603: The distributed client running on each computer gathers advisories from advice provider sites;

Step 604: The distributed client running on each computer reports relevant advisories to the central server;

Step 605: The administrator views details of relevant messages;

Step 606: The administrator deploys the actions to the distributed clients which are relevant to the advice; and Step 607: The distributed client receiving the actions performs the action to follow the advice.

Figure 6A:
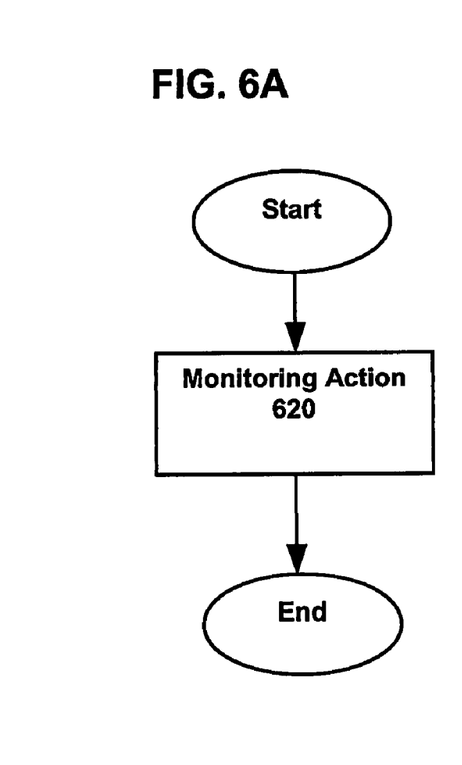
FIG. 6A is a flow diagram illustrating an additional step for the method 600 according to the invention.

In another equally preferred embodiment, the method further comprises a step as showing in FIG. 6A:

Step 620: The administrator monitors the status of actions deployed to each computer.

Figure 6B:
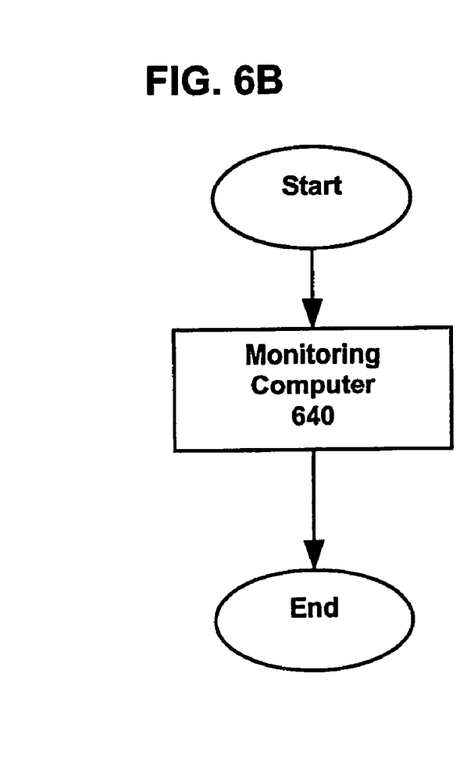
FIG. 6B is a flow diagram illustrating another step for the method 600 according to the invention.
Figure 6C:
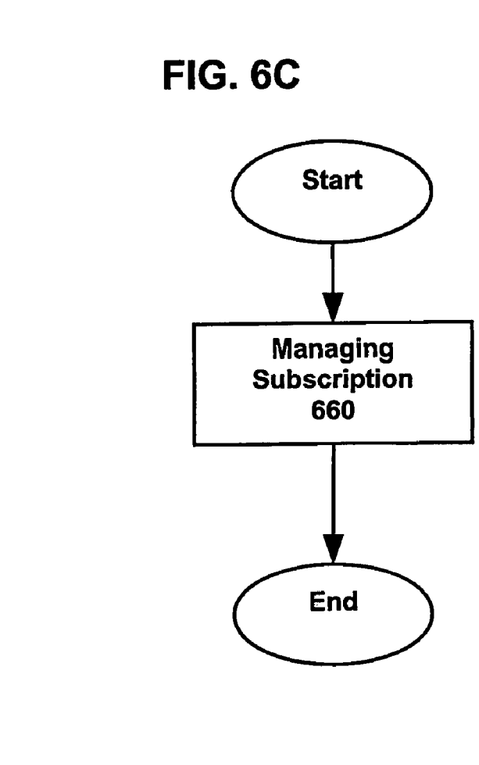
FIG. 6C is a flow diagram illustrating another step for the method 600 according to the invention.

In another equally preferred embodiment, the method further comprises a step as showing in FIG. 6B:

Step 640: The administrator monitors the status of each computer.

In another equally preferred embodiment, the method further comprises a step as showing in FIG. 6A:

Step 620: The administrator manages the subscription of advice provider sites to each of the computers in the network.

Client/Server Communications

There are several modes of communication between the distributed client and various servers such as the advice provider servers, the mirror server, the registration server, the reporting server, and the action server.

The advice provider servers are Web servers offering advice provider site subscriptions. They can be either local to the enterprise network or external to the network provided the direct external Web access is allowed.

In many enterprises, direct Web access is not available. Instead, a proxy server is used. In many cases, the proxy requires password-level authentication. For such enterprises, the embodiment of the system requires installing and running a mirror server. This also provides bandwidth management advantages.

The registration server is a component of the central server, which processes the registration requests from distributed clients and the server-to-client communication requests from other components of the central server.

Reporting server is also a component of the central server, which processes reports of relevance events from individual computers and passes them on to the central database.

The action server is also a component of the central server, which receives action requests from the management interface and serves them up to individual distributed clients.

Although these components are described separately here, they are often physically hosted on one machine. However, it is worth keeping in mind that the system can be easily reconfigured so that, for example, the mirror server, the reporting server, and the action servers are on their own server box. The ability to decompose the system in this way can be an important feature for scalability in terms of both network bandwidth use and the number of supported computers within a deployment, and can also be useful for administrative segmentation.

For the advice provider site URLs, the distributed client looks in the masthead files located in its install folder. The other servers are all reached through URLs recorded in the central server masthead file, located in the registry.

These masthead files are all under the control of the management interface.

The specific modes of communication between the distributed client and these servers include advice gather traffic, registration traffic, reporting traffic and action traffic.

When mirroring is disabled, the distributed client uses HTTP to access each advice provider server directly. Mirroring involves first a request for a directory listing that tells the distributed client what content is available at the site; the distributed client requests whatever content is new, and the advice provider server sends a single advice digest containing all requested content. The typical size of such a message is no more than about 2 kilobytes per advice. When mirroring is enabled, the distributed client uses HTTP to access the mirror server directly, making a request for the content that would have been delivered by a (hypothetical) direct access over the Internet to the specific advice provider site. If the mirror server is internal to the LAN, this saves on Internet access charges and offers what is considered improved security. In a network in which computers are not allowed to access the Internet directly without password authorization, mirroring must be enabled.

The distributed client uses HTTP to send to the registration server the distributed client's previous computer ID and ancillary information. The distributed client sends its previous computer ID and ancillary information to the registration server via HTTP. The registration server responds by sending a UDP message to the distributed client (by default to port 6603), indicating the distributed client's new computer ID and ancillary information.

The distributed client sends the reporting server a simple text file using an HTTP POST operation. The text file contains, in a transparent format, a list of all changes in relevance status on that computer since the previous relevance evaluation.

The distributed client uses HTTP requests containing the computer ID to gather action requests addressed specifically to it from the advice provider server.

Note that because the client/server traffic is directed via URLs, it is possible to reconfigure any or all of the HTTP requests to become HTTPS requests, or to reconfigure the URL, so that HTTP requests use port numbers other than the default ports 80 and 81. This may provide extra security benefits.

In the system, the distributed client initiates most of the communications. It maintains a schedule that is controlled by parameters in the masthead files. For example, an advice provider site masthead file contains the recommended frequency of gathering for that site, and the central server masthead file contains the recommended frequency for registration, and for gathering of actions.

However, there are exceptions. The central server can send, via the reporting server, a UDP message to a specific distributed client telling the distributed client to gather actions immediately or gather advisories immediately. Moreover, the management interface allows the system administrator to override advice provider site subscription policies of the site publisher, for example increasing or reducing the frequency of gathering or constraining gathers to take place at only certain times of day.

When if there is no network connection, the distributed client simply performs another evaluation loop, checking for the relevance of any advice message in the current advice pool on that computer. At the end of that loop, if any advisories are relevant at that time, it then attempts to communicate relevance back to the reporting server.

Message Authentication

The management system authenticates certain messages using secure public-key infrastructure (PKI) signature mechanisms based on digital encryption technology. In fact, PKI technology is deployed to protect the integrity of both advice content and action content.

The site author signs the communications from an advice provider site to a distributed client digitally. The signature must match the site's masthead file, which was placed in the distributed client install folder when the system administrator subscribed the distributed client to that site.

The action server signs every message digitally. Thus if the signature validation fails on the distributed client side, the message is ignored and discarded. This signature must match the action site's masthead file, which was placed in the Windows registry when the distributed client was installed.

To propagate any action request from the central server to the distributed client, the person operating the management interface must enter the signing password. This requirement is designed to prevent unauthorized users from using the management interface to propagate inappropriate actions.

Because of the important role played by the PKI and the signing password, it is very important to guard the public/private key pair and the password well, revealing them only to specially trusted people.

Action Capabilities

The distributed client performs actions on the computer at the request of the management interface operator. These actions can address process management issues, such as changing the advice provider sites to which the computer is subscribed, or system management tasks, such as changing the clock on the computer to agree with the central server clock, or they can involve downloading and installing a file. Such actions are specified in an Action Scripting Language, which enables the specification of actions that affect the computer as follows:

Files: Delete, move, or copy specific files;
Registry: Set or delete registry entries;
Commands: Run DOS commands or Visual Basic or JavaScript commands; and
DLLs: Delete, add, or commit various DLL modules.

Actions that offer management of the process can also be specified:

Advice Ops: Delete, close, or restore an advice message;
Site Ops: Subscribe or unsubscribe to an advice provider site;
Gather Ops: Change the gathering schedule or force an immediate gathering; and
Evaluation: Force an immediate relevance evaluation of advisories.

As a scripting language, this language contains flow control facilities that enable conditional execution:

Continue if {condition}: Continue if the condition is true.
Pause while {condition}: Do not continue until the condition is false.

The Action Scripting Language further offers a variety of user interface tools that enable the distributed client to interact with the user—for example, browseto, which opens a browser window at a specified URL. In many embodiments of the advice management system, system administrators do not want to involve the user in the process, although it is easy to imagine situations in which such involvement would be valuable, particularly because it can be pinpoint-directed to computers having specific attributes.

In addition, the action can be relevance-mediated, so that they are only applied on a certain computer if they are still relevant at the moment they are being considered for execution. This avoids the problem of fixing a problem that is no longer present on the machine at the time the action request to fix the problem is received.

The action can be scheduled, so that they are only applied on a certain computer at a certain time of day, local time. This makes it possible to run actions after everyone has gone home for the night, in whatever time zone "night" might be.

In short, the distributed client offers a powerful set of actions within a sensible context of scheduling and attention to continued relevance.

Network Traffic Considerations

The embodiment described above has been designed to be a lightweight client/server process which is highly responsive, giving the system administrator an up-to-the-minute view of the state of the network, while at the same time keeping host computer performance high and network traffic low.

To understand how this is accomplished, the following factors must be considered.

First, the advice management system reacts only to changes in state of the computer. Every effort is made to report only how relevance is different now than it was in the previous evaluation loop. Because very few relevance events occur every day, most of the time the distributed client is not reporting anything to the server. In fact, if there are no relevance events in a specific day, the only interactions are likely to be a registration, hourly action gathers, and one or two advice gathers per subscribed site. The total network traffic associated with the registration and the action gathers may be less than a few kilobytes on that day.

Second, the advice gathering process likewise reacts only to changes in state of the advice provider site, so that every effort is made to report only new advisories that were not previously downloaded by the distributed client. If there are no new messages on a given day, the total network traffic associated with the advice gathering may be less than a few kilobytes on that day.

Third, the method described overhead, i.e. total bandwidth consumption when there are no issues that need to be dealt with, is absolutely minimal and beneath the radar even for computers operating on intermittent dial-up connections.

Fourth, when there are Issues to be dealt with, the method described above is likewise efficient. Individual messages are very compact: an advice message is typically less than 2 kilobytes in size, a registration request less than 200 bytes, a registration response less than 400 bytes, and a relevance report less than 2 kilobytes. In addition, data compression is used where possible in the advice provider server, including both standard text compression algorithms and client-side include procedures.

Finally, in large organizations, where saving percentages of network bandwidth leads to appreciable benefits, it would be worth the extra effort to use mirroring to avoid the need for each distributed client to reach the public Internet and download all of its content over the Internet.

In summary, in most enterprise environments, the bandwidth use per distributed client by the method described above is negligible compared to existing bandwidth use for processes, such as e-mail, Web surfing, and Web-based data entry.

Security Considerations

Because the distributed client can change the configuration of the computer on which it is running, including removing and updating files, its security must be considered.

The distributed client reports only to the reporting server and honors only action requests from the action server. It is not easy to tamper with the URLs naming these servers because they are contained in digitally signed masthead files that are essentially forgery-proof. Furthermore, the content from these servers is digitally signed and thus is also essentially forgery-proof. These factors suggest that IP spoofing or DNS spoofing attacks are unlikely to be effective. Corporate networks with firewalls and other security measures are in all likelihood be far more secure.

Although it seems unnecessary, increasing the security of the communication process between the distributed clients and the central server is possible through several well-understood precautions that we only sketch here. This invention comprehends two strategies.

The first strategy is the closing off public access. This prevents any direct interactions between the distributed client and the public Internet. The system administrator has several choices. He can operate a mirror server, so that no individual distributed client needs to access to the public Internet. Alternatively, he can rewrite the URLs in the central server masthead file and the advice provider site masthead files so that they use port numbers which are not well known, or he can block firewall ports that correspond to the newly assigned set of distributed client port numbers.

The second strategy is secure public access. This strategy allows the use of the public Internet but makes access more secure by guaranteeing, not only the authenticity of the documents being delivered over the Internet, but also the privacy and security of the actual connection. The system administrator can rewrite the URLs in the central server masthead file to use HTTPS rather than HTTP. Then all transactions between the distributed clients and the central server are digitally encrypted and so are protected in the same way that modem e-commerce transactions are protected.

Although the invention is described herein with reference to the preferred embodiment, one skilled in the art will readily appreciate that other applications may be substituted for those set forth herein without departing from the spirit and scope of the present invention.

Accordingly, the invention should only be limited by the claims included below.

The invention claimed is:

1. An apparatus for formalizing, diffusing and enforcing policy advisories and for monitoring policy compliance in the management of networks of computational devices, comprising:
   a unified management interface;
   a plurality of distributed clients, each of which runs on a corresponding networked computational device, wherein each of said distributed clients determines relevance of an advice message by evaluating a relevance clause of said advice message, while automatically retrieving properties of a computational device on which said distributed client runs;
   a central server coupled to a central database, said central server for coordinating relay of information to and from individual computational devices, storing and retrieving information about individual computational devices and presenting information to a system administrator via said unified management interface, said central server comprising:
      a registration server, wherein said registration server processes registration requests from distributed clients;
      a reporting server, wherein said reporting server process reports of relevance events from individual computers and passes them on to the central database; and
      an action server, wherein said action server receives action requests from said management console serves them up to individual distributed clients;
   at least one advice server providing a plurality of advisories directly to said distributed clients;
   a protocol for diffusing queries across the network;
   wherein said management interface conveys reports to said administrator received from said distributed clients via said central server; and
   wherein said advisories formally target specific states of a computational device and formally specify actions to take in response thereto.

2. The apparatus of claim 1, further comprising: a mirror server that collects advice contents of advice provider sites from a global network, wherein each of said distributed clients gathers relevant advisories from said mirror server.

3. The apparatus of claim 1, wherein said relevance clause is written in a formal descriptive language.

4. The apparatus of claim 1, wherein said management interface further comprises: means for adding, modifying, or canceling a subscription of said distributed clients to one or more advice provider sites.

5. The apparatus of claim 4, wherein said management interface further comprises: means for selecting a group of computational devices, specifying action messages, scheduling, and controlling execution when deploying actions proposed by relevant advice messages.

6. The apparatus of claim 5, wherein said management interface further comprises: means for securely deploying actions of relevant advice messages to a selected group of said distributed clients.

7. The apparatus of claim 6, wherein said management interface further comprises: means for monitoring status of deployed actions.

8. The apparatus of claim 7, wherein said management interface further comprises: means for stopping previously deployed actions which have not finished running.

9. The apparatus of claim 8, wherein said management interface further comprises: means for monitoring status of each computational device while actions are being deployed and executed.

10. The apparatus of claim 9, wherein said means for monitoring allows said system administrator to define and retrieve customized properties of computational devices using a formal descriptive language.

11. A communication method for managing network policy for networks of computational device, comprising the steps of:
    registering a plurality of computers to a central server by a plurality of distributed clients, each of said plurality of distributed clients running on one of said computers, said central server comprising:
        a registration server, wherein said registration server processes registration requests from distributed clients;
        a reporting server, wherein said reporting server process reports of relevance events from individual computers and passes them on to the central database; and
        an action server, wherein said action server receives action requests from said management console serves them up to individual distributed clients;
    subscribing said distributed clients to a plurality of advice provider sites for each registered computer by a network administrator using a unified management interface;
    gathering by each of said plurality of clients a plurality of advisories from said advice provider sites for each registered computer, wherein each of said advisories comprises: a relevance clause written in a formal descriptive language to specify criteria determining when said advisory is relevant; a message providing explanatory material explaining said advisory; and an action providing a solution which can be deployed by said central server from a management interface and executed;
    reporting relevance of said advisories from said advice provider sites for each registered computer to said network administrator using said unified management interface by means of said central server;
    viewing said advisories by a system administrator with a unified management interface;
    deploying selected actions to a selected group of computers by said system administrator to said central server with said management interface by means of said central server; and
    performing deployed actions by said distributed clients running on said registered computer to apply solutions.

12. The method of claim 11, further comprising the step of: monitoring status of said deployed actions by said system administrator using said management interface.

13. The method of claim 11, further comprising the step of: monitoring status of each registered computer by said system administrator using said management interface.

14. The method of claim 11, further comprising the step of: managing subscription of advice provider sites to each registered computer by said system administrator using said management interface.

15. The method of claim 11, wherein said action is only applied when said advisory is determined relevant to said computer.

16. The method of claim 11, wherein said action can be scheduled so that it is only applied at a certain time of day.

17. The method of claim 11, wherein said action is signed digitally when deployed from said central server.

18. The method of claim 11, wherein said action is any of the group comprising: deleting, moving, or copying specific files; setting of deleting registry entries; executing script commands; deleting, adding, or committing various DLL modules; deleting, closing, or restoring an advisory; subscribing or unsubscribing an advice provider site; changing a gathering schedule or forcing an immediate gathering; and forcing an immediate relevance evaluation of advisories.

19. The method of claim 11, wherein said action is only applied when said advisory is determined relevant to said computer.

20. The method of claim 11, wherein said action can be constrained so that it may be executed when a computationally verifiable condition is met.

21. A distributed client for a computer in a network policy management system for networks of computational devices, comprising:
    means for gathering advisories from a plurality of advice provider sites;
    means for determining relevance of said advisories, wherein each of said advisories comprises:
        a relevance clause written in a formal descriptive language to specify criteria determining when said advisory is relevant;
        a message providing explanatory material explaining said advisory; and
        an action providing a solution;
    means for reporting relevance to a central server coupled to a central database, said central server for coordinating relay of information to and from individual computational devices, storing and retrieving information about individual computational devices and presenting information to a system administrator via a unified management interface, said central server comprising:
        a registration server, wherein said registration server processes registration requests from distributed clients;
        a reporting server, wherein said reporting server process reports of relevance events from individual computers and passes them on to the central database; and
        an action server, wherein said action server receives action requests from said management console serves them up to individual distributed client; and
    means for gathering actions from said central server;
    wherein said distributed client gathers advisories from said plurality of advice provider sites with said means for gathering advisories, and
    wherein said distributed client determines relevance of said advisories with said means for determining relevance and wherein said distributed client may report relevant advisories by said means for reporting.

22. The distributed client of claim 21, further comprising: means for executing said actions; wherein said distributed client retrieves said actions from said central server with said means for gathering and performs said actions using said means for executing.

23. The distributed client of claim 21, wherein said action is only applied when said advisory is determined relevant to said computer.

24. The distributed client of claim 21, wherein said action can be constrained so that it may be executed when a computationally verifiable condition is met.

25. The distributed client of claim 21, wherein said action is signed digitally when deployed from said management interface.

26. The distributed client of claim 21, wherein said action is any of the group comprising:
    deleting, moving, or copying specific files;
    setting or deleting registry entries;
    executing script commands;
    deleting, adding, or committing various DLL modules;
    deleting, closing, or restoring an advisory;
    subscribing or unsubscribing to an advice provider site;
    changing a gathering schedule or forcing an immediate gathering; and
    forcing an immediate relevance evaluation of advisories.

* * * * *

UNITED STATES PATENT AND TRADEMARK OFFICE
CERTIFICATE OF CORRECTION

PATENT NO. : 7,607,572 B2
APPLICATION NO. : 10/495109
DATED : October 27, 2009
INVENTOR(S) : David Salim Hindawi et al.

Page 1 of 1

It is certified that error appears in the above-identified patent and that said Letters Patent is hereby corrected as shown below:

Title Page correct item (54) and in Col. 1, line 1:

Replacement title: FORMALIZING, DIFFUSING, AND ENFORCING POLICY ADVISORIES AND MONITORING POLICY COMPLIANCE IN THE MANAGEMENT OF NETWORKS with

APPARATUS AND METHOD FOR FORMALIZING, DIFFUSING, AND ENFORCING POLICY ADVISORIES AND FOR MONITORING POLICY COMPLIANCE IN THE MANAGEMENT OF NETWORKS OF COMPUTATIONAL DEVICES

Title Page add to item (63) -- RELATED U.S. APPLICATION DATA:

"...and a Divisional of 09/272,937, now Pat. No. 6,256,664, and 60/358,996 filed February 21, 2002, and 60/338,427 filed November 9, 2001."

Signed and Sealed this

Sixteenth Day of November, 2010

David J. Kappos
*Director of the United States Patent and Trademark Office*